US008801346B2

(12) United States Patent
Su

(10) Patent No.: US 8,801,346 B2
(45) Date of Patent: Aug. 12, 2014

(54) CHAMFERING MACHINE FOR BOTH HANDHELD AND STATIONARY USE

(75) Inventor: Wei-Chung Su, Taichung (TW)

(73) Assignee: Yen Shen Electric Inc. Co., Ltd., Taichung (TW)

( * ) Notice: Subject to any disclaimer, the term of this patent is extended or adjusted under 35 U.S.C. 154(b) by 276 days.

(21) Appl. No.: 13/540,988

(22) Filed: Jul. 3, 2012

(65) Prior Publication Data

US 2013/0098221 A1 Apr. 25, 2013

(30) Foreign Application Priority Data

Oct. 21, 2011 (TW) ............................. 100219895 U
Mar. 23, 2012 (TW) ............................. 101205345 U

(51) Int. Cl.
*B23C 3/12* (2006.01)
*B26D 3/02* (2006.01)

(52) U.S. Cl.
CPC ........................................ *B26D 3/02* (2013.01)
USPC ........................................... 409/138; 409/178

(58) Field of Classification Search
CPC ......... B23Q 9/0028; B23C 3/126; B23C 3/12
USPC .................................. 409/138, 175, 178, 180
See application file for complete search history.

(56) References Cited

U.S. PATENT DOCUMENTS 3,893,372 A * 7/1975 Strakeljahn .................. 409/180
D295,140 S * 4/1988 Fukuda et al. .................. D8/61
5,028,179 A * 7/1991 Grasset .......................... 409/180
5,522,684 A * 6/1996 Heck ............................. 409/138
6,450,741 B1 * 9/2002 Cannelli, Jr. .................. 409/138

FOREIGN PATENT DOCUMENTS

JP 09234616 A * 9/1997
TW M281748 12/2005
TW I339601 4/2011

* cited by examiner

*Primary Examiner* — Daniel Howell
(74) *Attorney, Agent, or Firm* — Muncy, Geissler, Olds & Lowe, P.C.

(57) ABSTRACT

A chamfering machine for both handheld and stationary use includes: a base having two arms extending toward one side; a motor provided on the base and having a driving shaft; a cutter provided on the driving shaft; a cutting seat consisting essentially of first and second panels; a first handle located between the arms and having two ends respectively provided at the arms; a second handle having one end provided at a bottom portion of the base and a body portion extending in a direction opposite the direction in which the arms extend; and at least one fixing element located below and connected to the arms and having a bottom end lower than the bottom end of the base, wherein the bottom end of the at least one fixing element has at least one connecting portion with at least one fixing hole for connecting to a tabletop.

11 Claims, 11 Drawing Sheets

CHAMFERING MACHINE FOR BOTH HANDHELD AND STATIONARY USE

BACKGROUND OF THE INVENTION

1. Technical Field

The present invention relates to tools for machining workpieces or materials. More particularly, the present invention relates to a chamfering machine for both handheld and stationary use.

2. Description of Related Art

The conventional chamfering machines can be generally divided into the handheld type and the stationary type. For example, Taiwan Patent No. M281748 discloses structural improvement for a handheld chamfering machine whereas Taiwan Patent No. 1339601 discloses a stationary chamfering machine.

When the object to be chamfered is relatively large, a handheld chamfering machine is preferred for convenience of operation. When the object to be chamfered is relatively small or light, however, a stationary chamfering machine is typically used, allowing the operator to hold the object being chamfered; thus, the object can be kept from slipping, and smooth operation is achievable. Therefore, if it is desired to chamfer both relatively large and relatively small objects, at least two chamfering machines must be bought.

BRIEF SUMMARY OF THE INVENTION

The primary object of the present invention is to provide a chamfering machine for both handheld and stationary use, so that a user not only can chamfer an object by holding the chamfering machine, but also can fix the chamfering machine to a tabletop and hold the object being chamfered.

To achieve the above object, the present invention provides a chamfering machine for both handheld and stationary use. The chamfering machine includes a base, a motor, a cutter, a cutting seat, a first handle, a second handle, and at least one fixing element. The base has two arms that extend from the base toward one side. In addition, the two arms are parallel to each other and are spaced by a predetermined distance. The motor is provided on the base and has a driving shaft. The cutter is provided on the driving shaft of the motor. The cutting seat consists essentially of a first panel and a second panel. One side of the first panel is located adjacent to one side of the second panel such that a predetermine angle is formed between the two panels. The cutter passes through and is thus exposed through the adjacent sides of the first panel and the second panel. The first handle is located between the two arms. The two ends of the first handle are provided at the two arms respectively. The second handle has one end provided at a bottom portion of the base and a body portion extending in a direction opposite the direction in which the two arms extend. The at least one fixing element is located below and connected to the two arms. The at least one fixing element has a bottom end lower than the bottom end of the base. Moreover, the bottom end of the at least one fixing element has at least one connecting portion for connecting to a tabletop, wherein each connecting portion has at least one fixing hole. Thus, a user can chamfer an object by holding the chamfering machine or, when necessary, directly fix the chamfering machine to a tabletop and hold the object being chamfered.

BRIEF DESCRIPTION OF THE SEVERAL VIEWS OF THE DRAWINGS

The technical features of the present invention will be best understood by referring to the following detailed description of the preferred embodiments in conjunction with the accompanying drawings, in which.

DETAILED DESCRIPTION OF THE INVENTION

Figure 1:
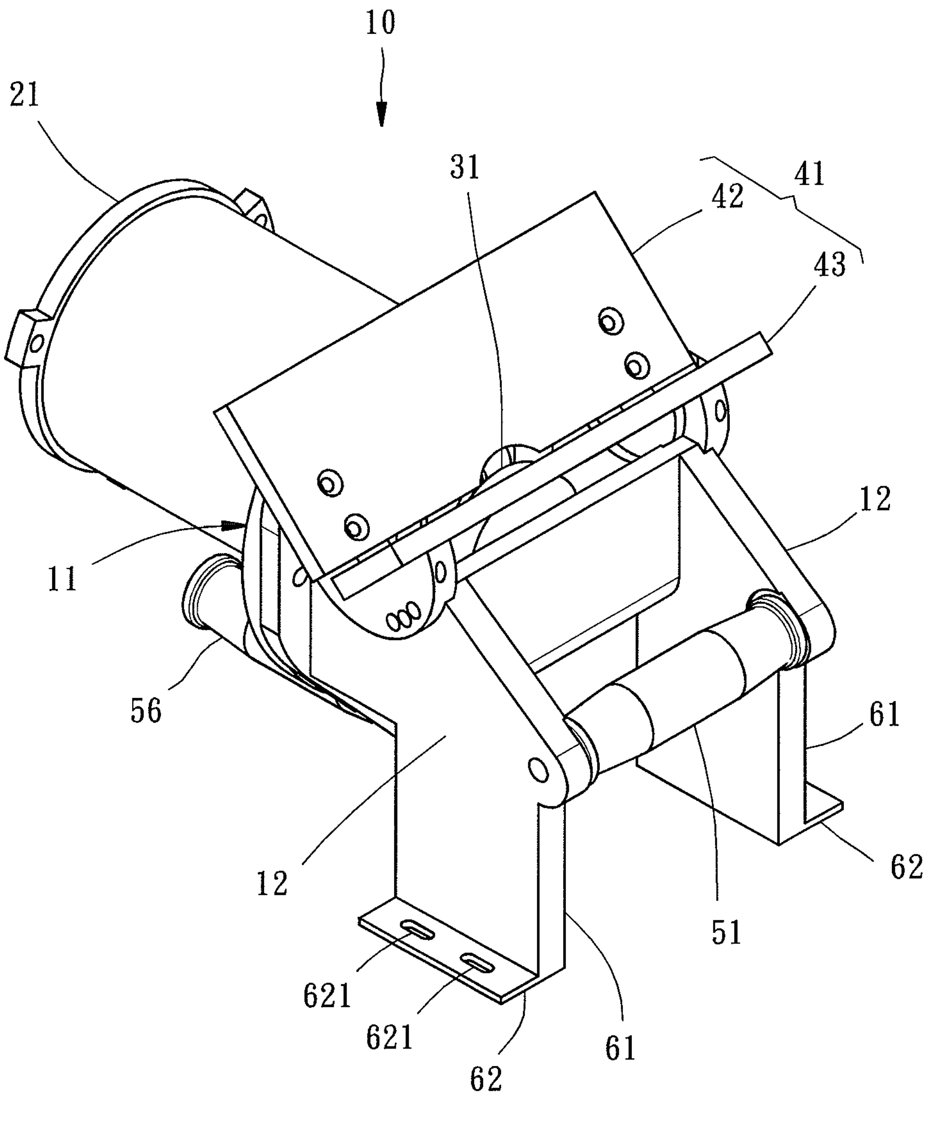
FIG. 1 is an assembled perspective view of the first preferred embodiment of the present invention.
Figure 2:
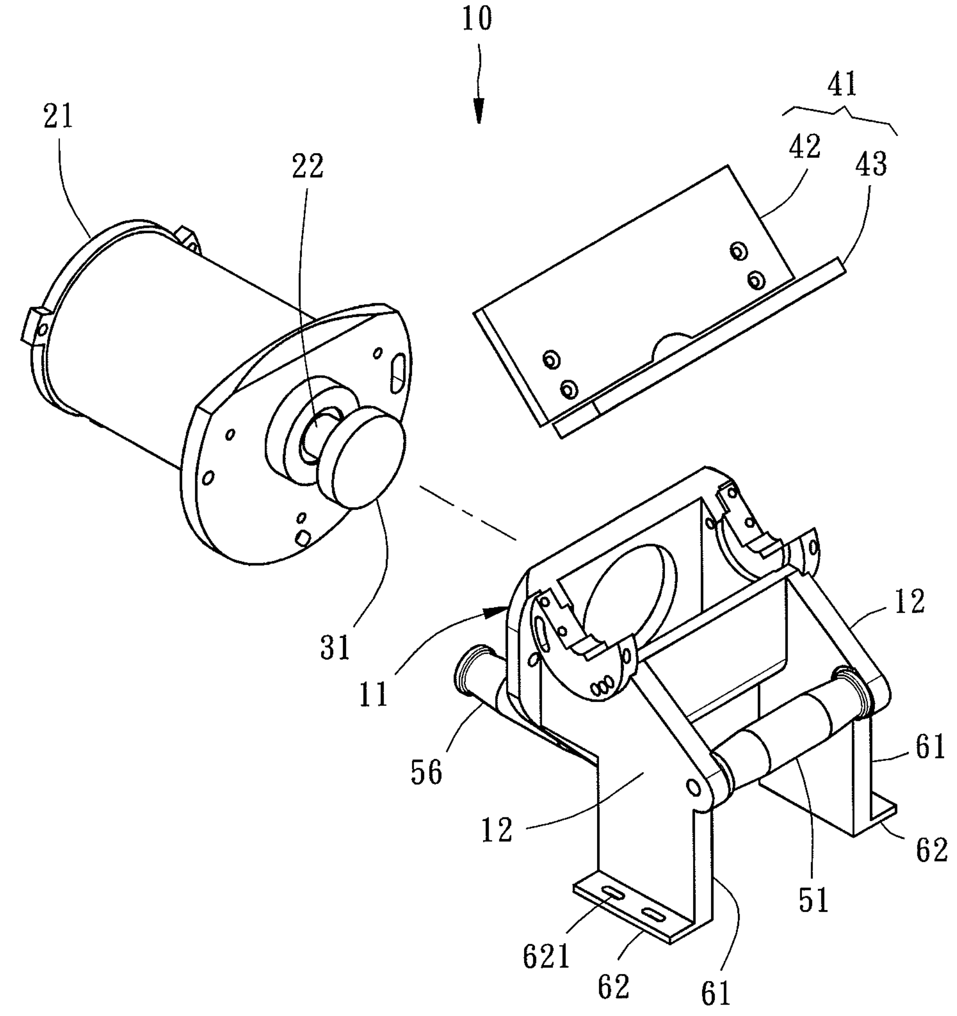
FIG. 2 is an exploded perspective view of the first preferred embodiment of the present invention.
Figure 3:
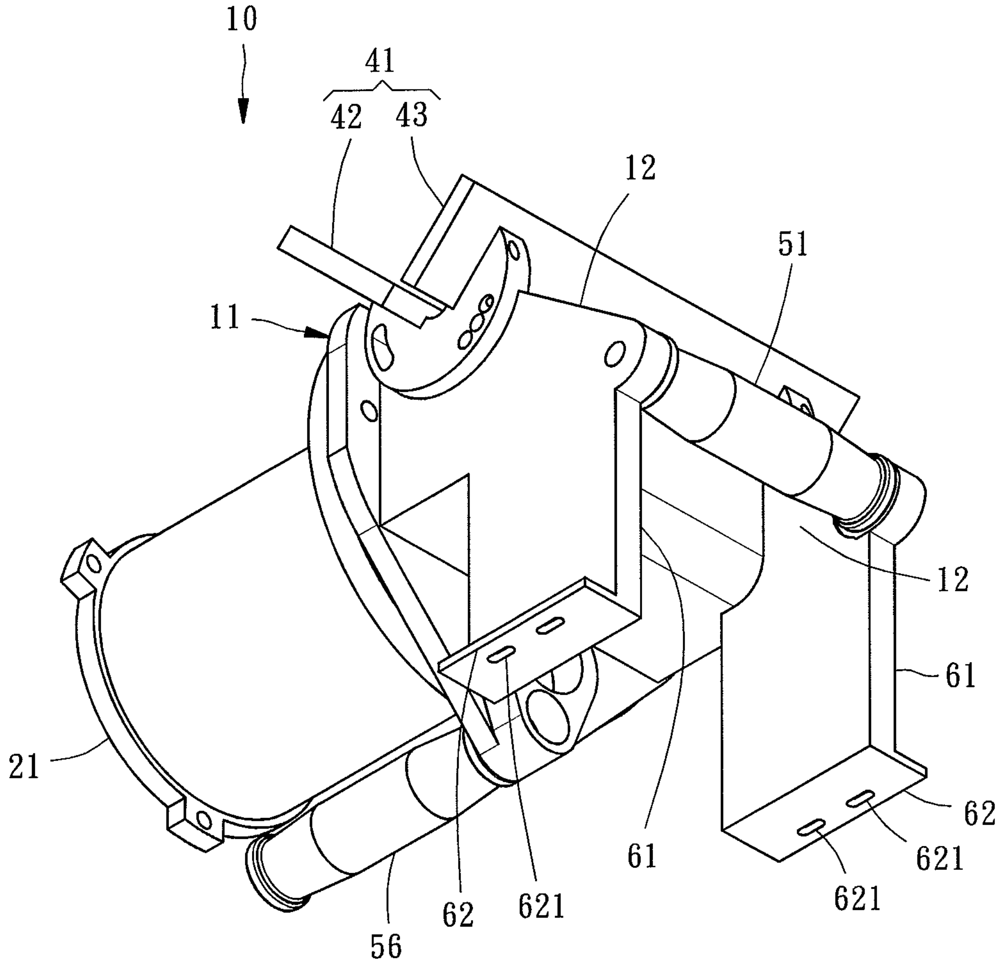
FIG. 3 is another assembled perspective view of the first preferred embodiment of the present invention, as seen from the bottom.
Figure 4:
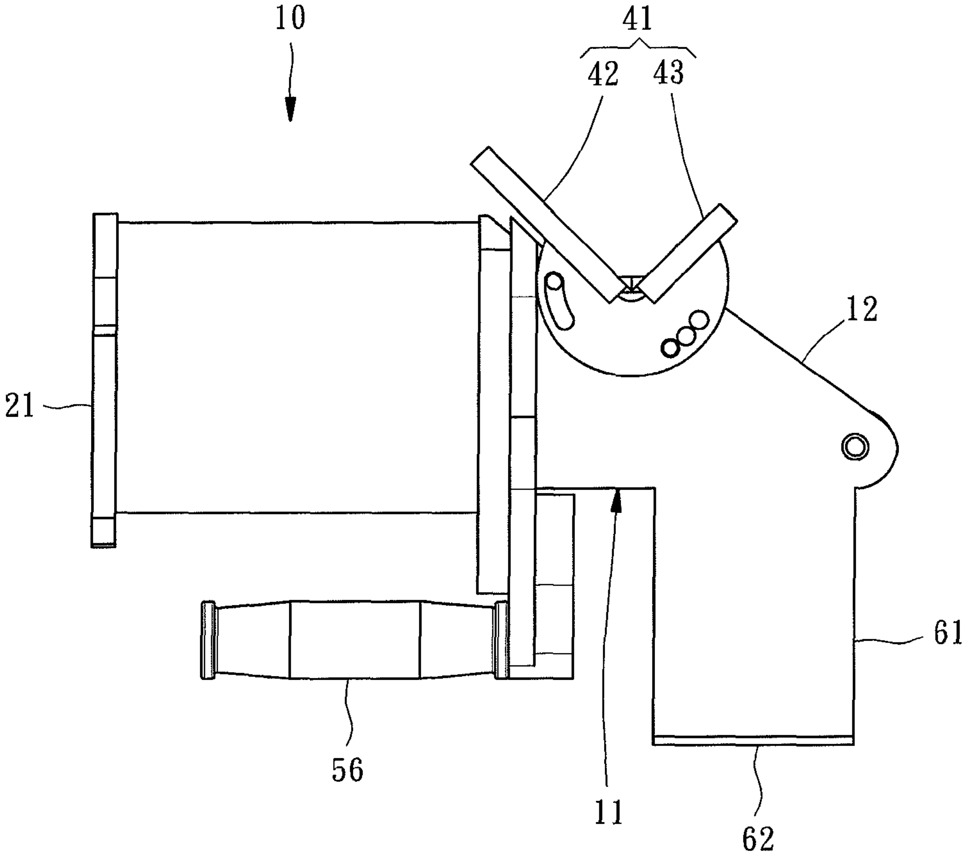
FIG. 4 is a side view of the first preferred embodiment of the present invention.

Referring to FIG. 1 to FIG. 5 for the first preferred embodiment of the present invention, a chamfering machine 10 for both handheld and stationary use consists essentially of a base 11, a motor 21, a cutter 31, a cutting seat 41, a first handle 51, a second handle 56, and at least one fixing element 61.

The base 11 has two arms 12 extending from the base 11 toward one side. The arms 12 are parallel to each other and spaced by a predetermined distance. As shown in FIG. 1, the two arms 12 extend forward from the base 11.

The motor 21 is provided on the base 11 and has a driving shaft 22.

The cutter 31 is provided on the driving shaft 22 of the motor 21.

The cutting seat 41 consists essentially of a first panel 42 and a second panel 43. One side of the first panel 42 is located adjacent to one side of the second panel 43 such that a predetermined angle is formed between the two panels 42 and 43. The cutter 31 passes through and is thus exposed through the aforesaid adjacent sides of the first panel 42 and the second panel 43. In this embodiment, the predetermined angle is 90 degrees.

The first handle 51 is located between the two arms 12. The two ends of the first handle 51 are provided at the two arms 12 respectively.

The second handle 56 has one end provided at a bottom portion of the base 11. The body portion of the second handle 56 extends in a direction opposite the direction in which the two arms 12 extend. In other words, the second handle 56 extends rearward while the two arms 12 extend forward.

The at least one fixing element 61 in this embodiment includes two fixing elements 61 located below and respectively connected to the two arms 12. In this embodiment, the two fixing elements 61 are plate-shaped and are each formed by a downward extension of one arm 12, wherein the downward extensions are of a predetermined length. The bottom ends of the two fixing elements 61 are lower than the bottom end of the base 11 and each have a connecting portion 62. In this embodiment, the connecting portions 62 are plate-shaped and are each formed by an outward extension of a bottom portion of one of the fixing elements 61, wherein the outward extensions are of a predetermined length. The two connecting portions 62 are configured for connecting to a tabletop 95 and each have at least one fixing hole 621. In this embodiment, each connecting portion 62 has two fixing holes 621, and each fixing hole 621 is a slot. In addition, each fixing element 61 is perpendicular to a plate surface of the connecting portion 62 connected thereto.

It should be pointed out that the fixing elements 61 are not necessarily plate-shaped and may be of other shapes as well. Also, the connecting portions 62 may extend inward rather than outward.

Operation of the first embodiment is described as follows.

Referring to FIG. 1 to FIG. 5, when used in the handheld mode, the chamfering machine 10 is held by both the first handle 51 and the second handle 56 in order to chamfer an object. The steps of such handheld operation are well known in the art and therefore will not be described herein.

Figure 5:
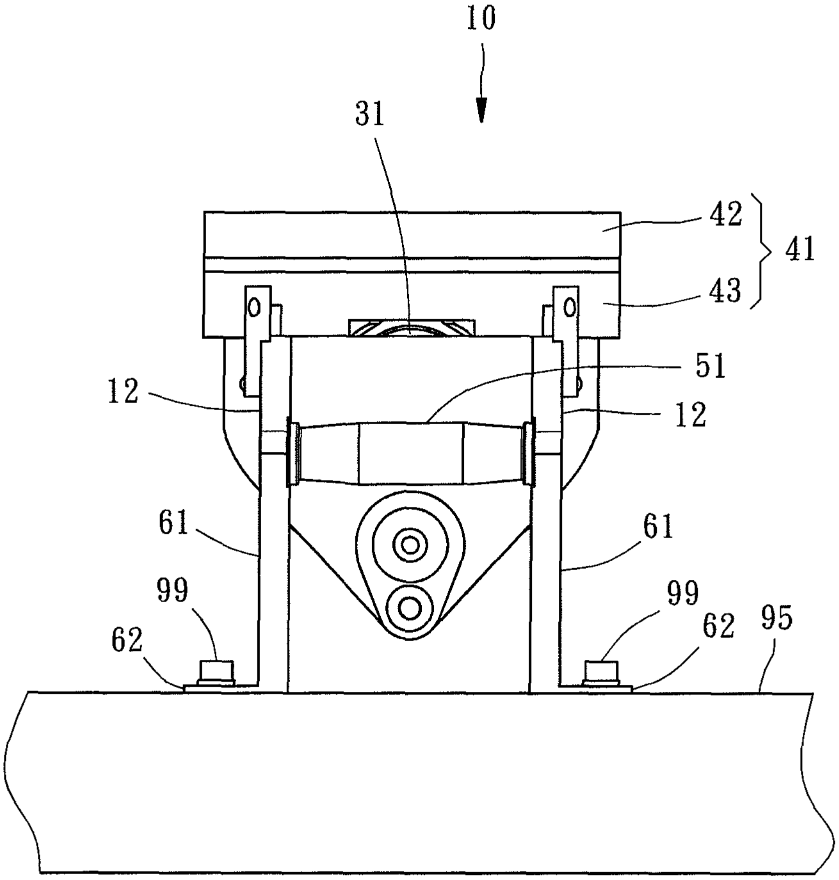
FIG. 5 schematically shows an application of the first preferred embodiment of the present invention, wherein the chamfering machine is fixed to a tabletop.
Figure 6:
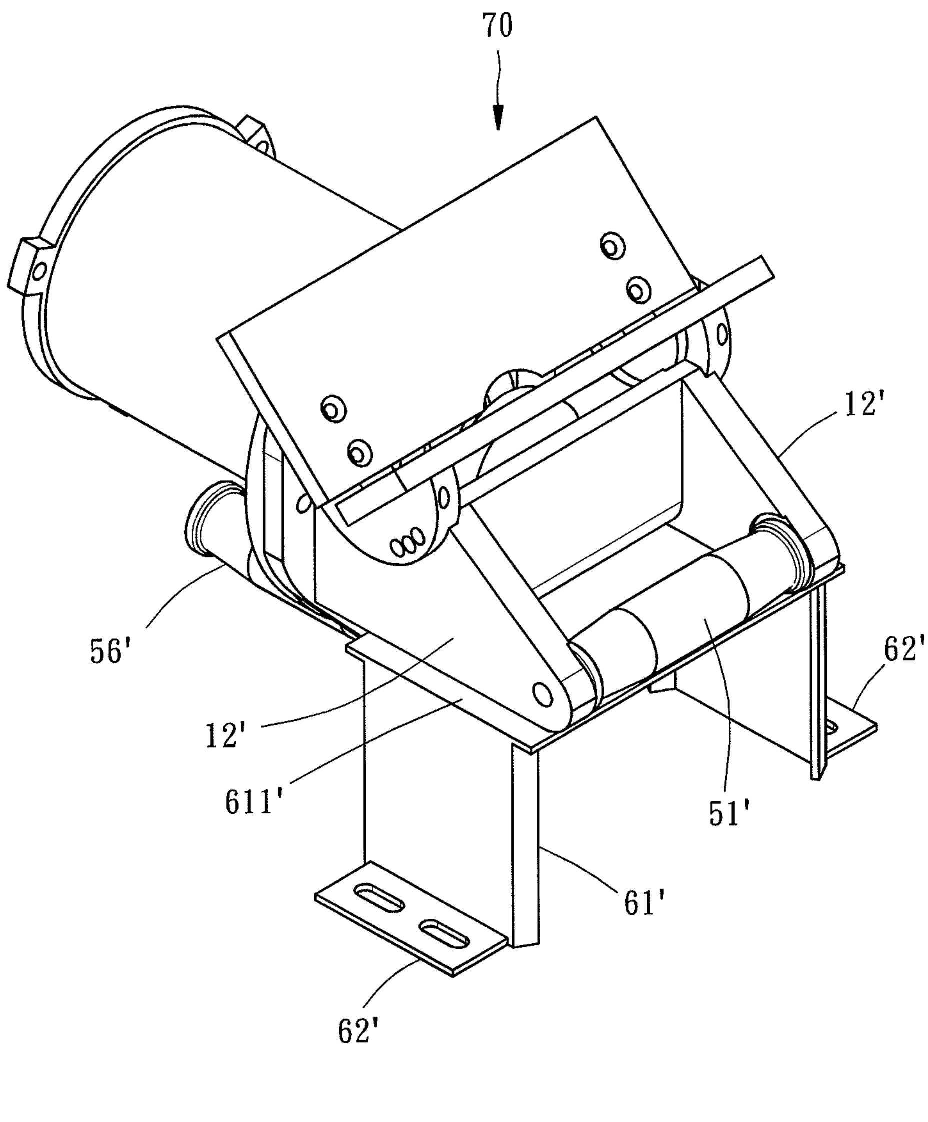
FIG. 6 is an assembled perspective view of the second preferred embodiment of the present invention.
Figure 7:
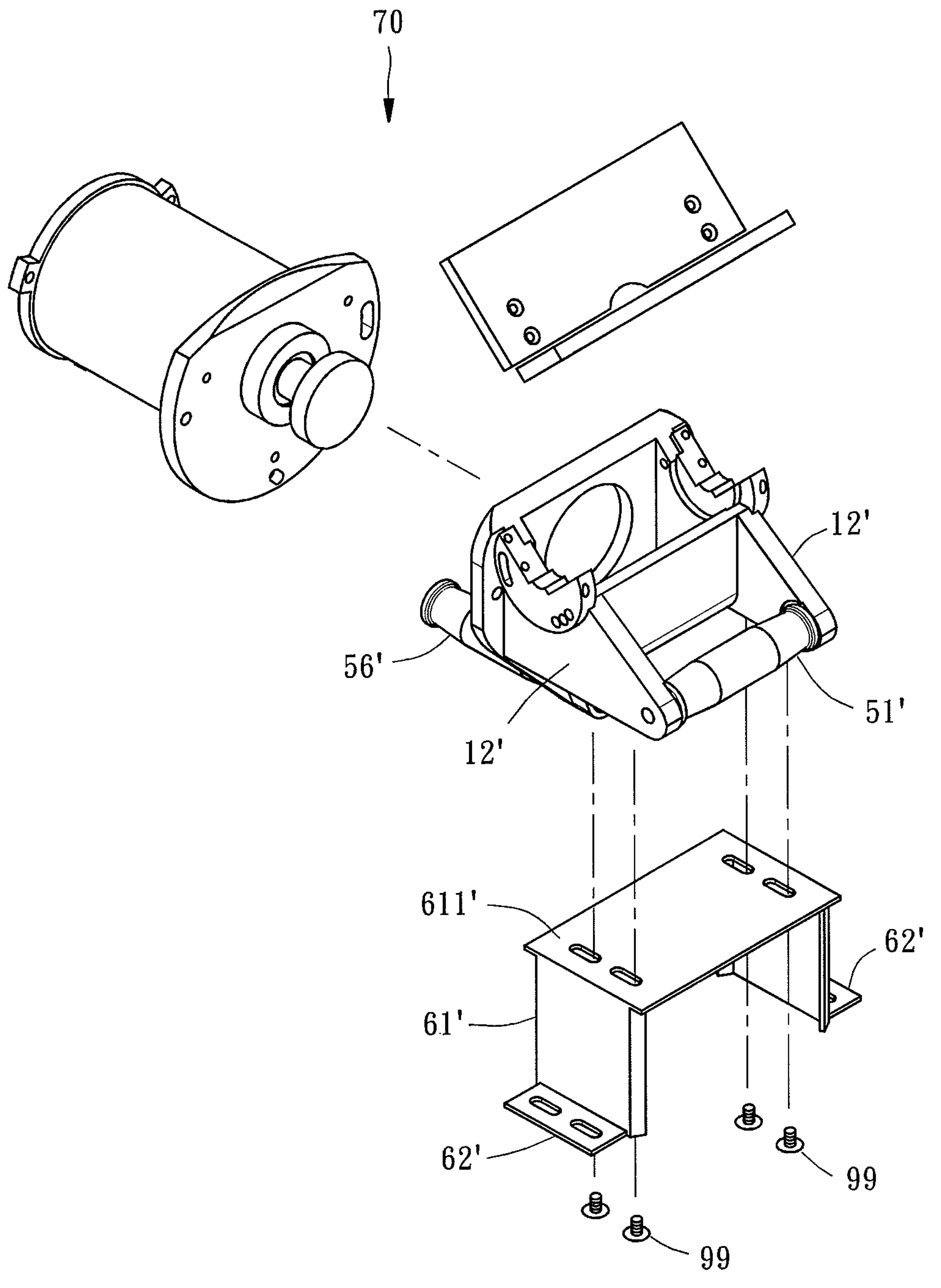
FIG. 7 is an exploded perspective view of the second preferred embodiment of the present invention.
Figure 8:
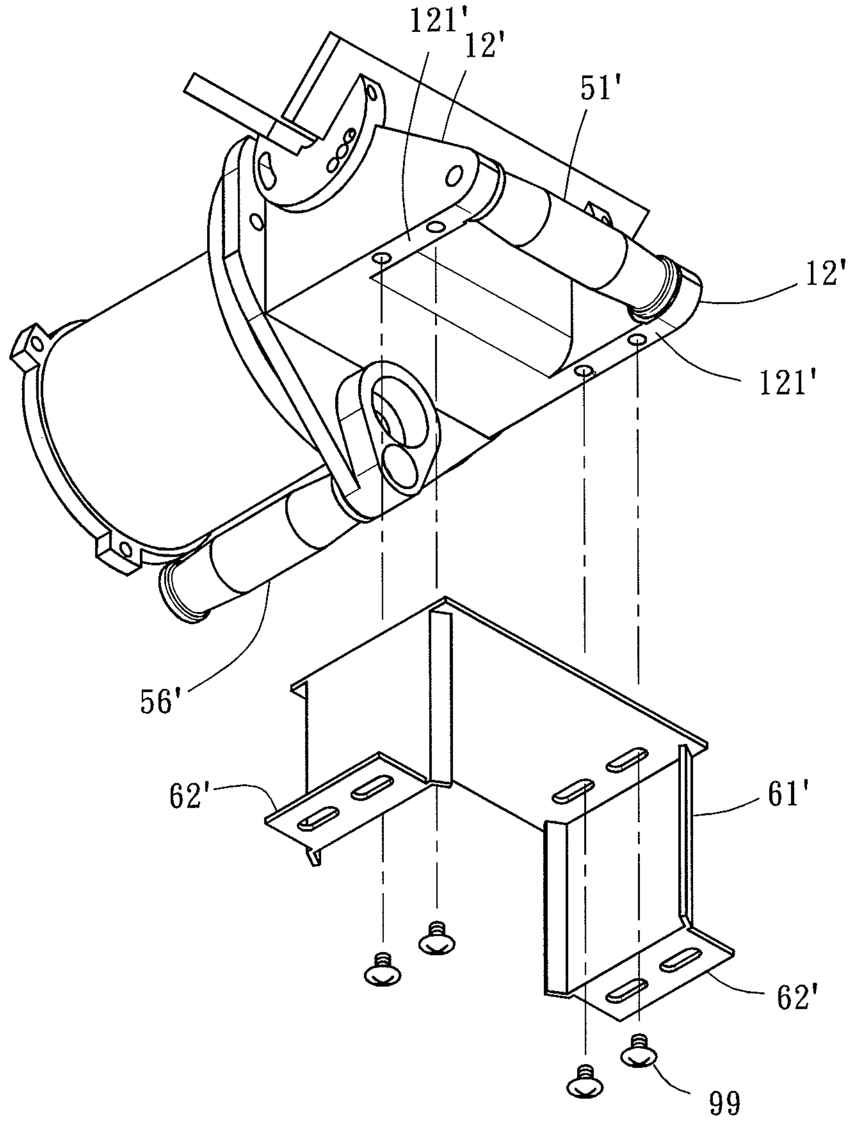
FIG. 8 is a partially exploded perspective view of the second preferred embodiment of the present invention, as seen from the bottom.
Figure 9:
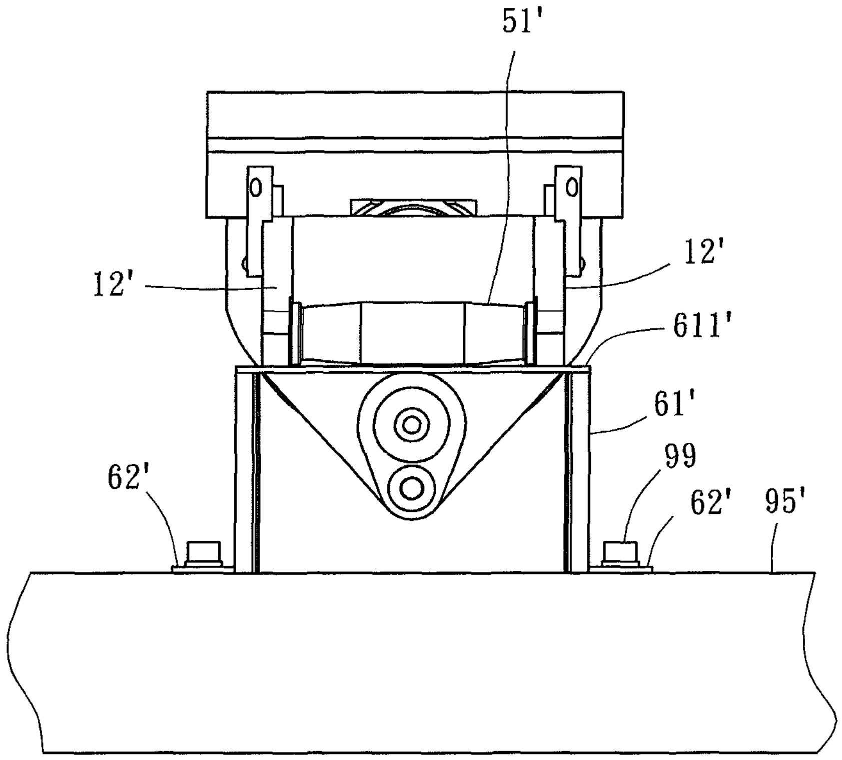
FIG. 9 schematically shows an application of the second preferred embodiment of the present invention, wherein the chamfering machine is fixed to a tabletop.

When used in the stationary mode, the chamfering machine 10 is directly fixed to the tabletop 95 by a plurality of fasteners (e.g., screws) 99 which pass through the fixing holes 621 respectively and are fastened to the tabletop 95 (see FIG. 5). No more additional elements are required for fixing the chamfering machine 10 in place. Thus, the complexity of the components and of the assembly of the chamfering machine 10 is reduced. This also prevents the scenario where loss of such additional elements keeps the chamfering machine 10 from operating in the stationary mode. Moreover, as the bottom ends of the two fixing elements 61 are lower than the bottom end of the base 11, the base 11 will not interfere with the tabletop 95 once the two connecting portions 62 are fastened to the tabletop 95 by the fasteners. As such, the chamfering machine 10 is securely installed on the tabletop 95 and ready to be used in the stationary mode. A user can easily chamfer an object of a relatively small size by holding the object and moving it along the cutting seat 41.

According to the above, the chamfering machine in the first embodiment can be used in the stationary mode as well as in the handheld mode.

FIG. 6 to FIG. 9 show the second preferred embodiment of the present invention, wherein the chamfering machine 70 for both handheld and stationary use is substantially the same as its counterpart in the first embodiment except for the following:

Each of the two arms 12' has a downwardly facing mounting surface 121'.

The at least one fixing element 61' is implemented in this embodiment by a single fixing element 61' having a top surface 611'. The top surface 611' is detachably connected to the mounting surfaces 121'. The fixing element 61' has an inverted U shape. The bottom edges of the two lateral portions of the fixing element 61' extend outward to form the two connecting portions 62' respectively. The two connecting portions 62' can be fastened to the tabletop 95' by a plurality of fasteners, thus fixing the fixing element 61' to the tabletop 95'.

The detachable connection between the fixing element 61' and the two mounting surfaces 121' enables the following two modes of use.

1. When the fixing element 61' is not connected to the two arms 12', a user can directly hold the first handle 51' and the second handle 56' for handheld operation.

2. Once the fixing element 61' is connected to the two arms 12', e.g., by a plurality of fasteners that fasten the top surface 611' of the fixing element 61' to the mounting surfaces 121' of the two arms 12', and the fixing element 61' is fixed to the tabletop 95', the chamfering machine 70 is ready for stationary use.

The rest of the structure of the second embodiment and the effects achievable thereby are the same as those in the first embodiment and will not be described repeatedly.

Figure 10:
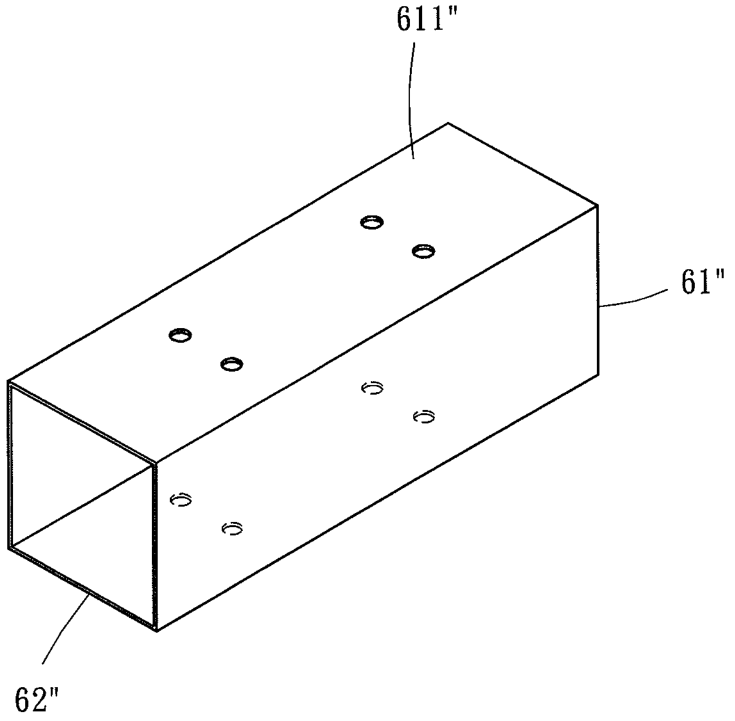
FIG. 10 is a perspective view of the fixing element in the third preferred embodiment of the present invention.
Figure 11:
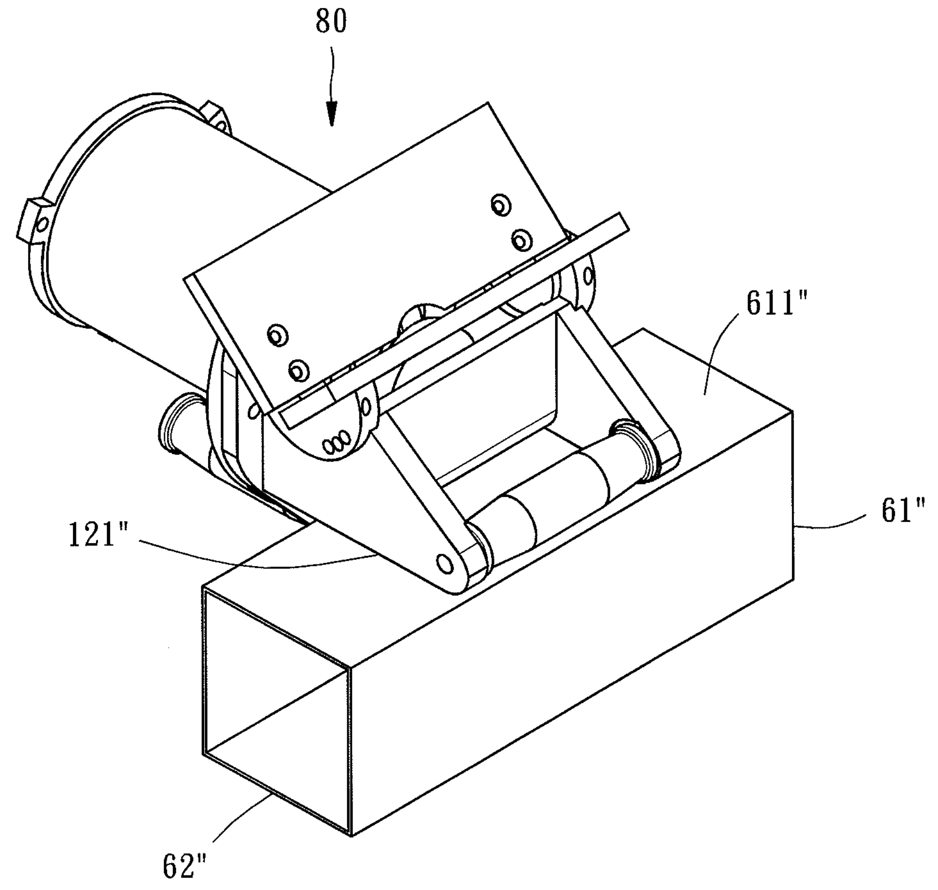
FIG. 11 is an assembled perspective view of the third preferred embodiment of the present invention.

Reference is now made to FIG. 10 and FIG. 11 for the third preferred embodiment of the present invention. The chamfering machine 80 for both handheld and stationary use is substantially the same as its counterpart in the second embodiment except for the following:

The fixing element 61" is a rectangular column whose bottom surface is formed as the connecting portion 62".

The top surface 611" of the fixing element 61" is detachably connected to the two mounting surfaces 121" while the connecting portion 62" formed by the bottom surface of the fixing element 61" can be fixed to the tabletop (not shown). Thus, the chamfering machine 80 is also operable in both the handheld mode and the stationary mode.

The rest of the structure of the third embodiment and the effects achievable thereby are the same as those in the first embodiment and will not be described repeatedly.

What is claimed is:

1. A chamfering machine for both handheld and stationary use, comprising:

a base having two arms extending from the base toward a side, the two arms being parallel to each other and spaced by a predetermined distance;

a motor provided on the base and having a driving shaft;

a cutter provided on the driving shaft of the motor;

a cutting seat consisting essentially of a first panel and a second panel, wherein a side of the first panel is located adjacent to a side of the second panel such that a predetermined angle is formed between the first panel and the second panel, the cutter passing through and being thus exposed through the adjacent sides of the first panel and the second panel;

a first handle located between the two arms and having two ends respectively provided at the two arms;

a second handle having an end provided at a bottom portion of the base, the second handle further having a body portion extending in a direction opposite a direction in which the two arms extend; and at least one fixing element located below and connected to the two arms, the at least one fixing element having a bottom end lower than a bottom end of the base, the bottom end of the at least one fixing element having at least one connecting portion for connecting to a tabletop, wherein each said connecting portion has at least one fixing hole.

2. The chamfering machine for both handheld and stationary use of claim 1, wherein there are two said fixing elements, each of the two fixing elements being formed by a said arm extending downward by a predetermined length, each said connecting portion being formed by a bottom portion of a said fixing element extending a predetermined length toward a side.

3. The chamfering machine for both handheld and stationary use of claim 2, wherein each said fixing element is plate-shaped.

4. The chamfering machine for both handheld and stationary use of claim 3, wherein each said connecting portion is plate-shaped.

5. The chamfering machine for both handheld and stationary use of claim 4, wherein each said fixing element is perpendicular to a plate surface of the connecting portion connected to the each said fixing element.

6. The chamfering machine for both handheld and stationary use of claim 1, wherein each said connecting portion has two said fixing holes.

7. The chamfering machine for both handheld and stationary use of claim 1, wherein each said fixing hole is a slot.

8. The chamfering machine for both handheld and stationary use of claim 1, wherein each of the two arms has a downwardly facing mounting surface, and there is one and only one said fixing element, the fixing element having a top surface detachably connected to the mounting surfaces.

9. The chamfering machine for both handheld and stationary use of claim 8, wherein the fixing element is inverted U-shaped and has two lateral portions, each said lateral portion having a bottom edge extending outward to form a said connecting portion.

10. The chamfering machine for both handheld and stationary use of claim 8, wherein the fixing element is a rectangular column having a bottom surface formed as a said connecting portion.

11. The chamfering machine for both handheld and stationary use of claim 1, wherein the predetermined angle is 90 degrees.

* * * * *